(12) United States Patent  
Jeong et al.

(10) Patent No.: US 10,784,490 B2  
(45) Date of Patent: Sep. 22, 2020

(54) POUCH TYPE OF BATTERY CELL HAVING UNIT ELECTRODE WHERE A PLURALITY OF ELECTRODE TABS ARE FORMED

(71) Applicant: LG Chem, Ltd., Seoul (KR)

(72) Inventors: Hee Seok Jeong, Daejeon (KR); Hyun Min Kim, Daejeon (KR); Ju Ri Kim, Daejeon (KR); Sei Woon Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/752,786

(22) PCT Filed: Oct. 13, 2016

(86) PCT No.: PCT/KR2016/011457  
§ 371 (c)(1),  
(2) Date: Feb. 14, 2018

(87) PCT Pub. No.: WO2017/069453  
PCT Pub. Date: Apr. 27, 2017

(65) Prior Publication Data  
US 2018/0254467 A1 Sep. 6, 2018

(30) Foreign Application Priority Data  
Oct. 22, 2015 (KR) .......................... 10-2015-0147175

(51) Int. Cl.  
*H01M 2/26* (2006.01)  
*H01M 10/0585* (2010.01)  
(Continued)

(52) U.S. Cl.  
CPC ......... *H01M 2/266* (2013.01); *H01M 2/0202* (2013.01); *H01M 2/0237* (2013.01);  
(Continued)

(58) Field of Classification Search  
None  
See application file for complete search history.

(56) References Cited

U.S. PATENT DOCUMENTS 6,159,633 A * 12/2000 Yang .................... H01M 2/266  
                                                        429/120  
2004/0058231 A1 * 3/2004 Takeshita ............ H01M 2/1066  
                                                        429/123  
(Continued)

FOREIGN PATENT DOCUMENTS

CN            1473367 A     2/2004  
CN            1753230 A     3/2006  
(Continued)

OTHER PUBLICATIONS

Search report from International Application No. PCT/KR2016/011457, dated Jan. 20, 2017.  
(Continued)

*Primary Examiner* — Eli S Mekhlin  
(74) *Attorney, Agent, or Firm* — Lerner, David, Littenberg, Krumholz & Mentlik, LLP (57) ABSTRACT

The present invention provides a battery cell including: an electrode assembly having a structure in which a positive electrode, a negative electrode, and a separator are laminated, each of the positive electrode and the negative electrode having 2×n (n≥2), wherein a positive tab is provided in each of odd-numbered sides, and a negative electrode tab is provided in each of even-numbered sides, and the positive electrodes and the negative electrode tabs are alternately formed along the sides; electrode terminals respectively disposed on a first side and a second side of the electrode assembly, in which outermost electrodes are disposed, or third sides which are side surfaces of the electrode assembly, being perpendicular to the first side and the second side, and  
(Continued)

a battery case having a structure of surrounding an external surface of the electrode assembly.

20 Claims, 7 Drawing Sheets (51) Int. Cl.
*H01M 2/30* (2006.01)
*H01M 10/0525* (2010.01)
*H01M 2/02* (2006.01)
*H01M 2/04* (2006.01)
*H01M 10/04* (2006.01)

(52) U.S. Cl.
CPC ......... *H01M 2/043* (2013.01); *H01M 2/0404* (2013.01); *H01M 2/0469* (2013.01); *H01M 2/0482* (2013.01); *H01M 2/30* (2013.01); *H01M 10/0413* (2013.01); *H01M 10/0463* (2013.01); *H01M 10/0525* (2013.01); *H01M 10/0585* (2013.01); *H01M 2002/0205* (2013.01); *H01M 2220/20* (2013.01); *H01M 2220/30* (2013.01); *Y02E 60/122* (2013.01); *Y02T 10/7011* (2013.01)

(56) References Cited

U.S. PATENT DOCUMENTS

| | | | |
|---|---|---|---|
| 2006/0035141 A1 | 2/2006 | Lee | |
| 2006/0115729 A1* | 6/2006 | Lee | H01M 2/26 429/211 |
| 2008/0070102 A1* | 3/2008 | Watanabe | H01M 2/26 429/91 |
| 2008/0278221 A1* | 11/2008 | Rowland | H02J 7/0016 327/536 |
| 2009/0229114 A1 | 9/2009 | Kimura | |
| 2011/0059347 A1 | 3/2011 | Lee et al. | |
| 2011/0206956 A1* | 8/2011 | Woods, Jr. | H01M 2/12 429/53 |
| 2013/0189569 A1 | 7/2013 | Youm | |
| 2013/0252071 A1* | 9/2013 | Teramoto | H01M 2/307 429/156 |
| 2013/0252078 A1* | 9/2013 | Kim | H01M 2/0469 429/179 |
| 2014/0220409 A1 | 8/2014 | Hohenthanner et al. | |
| 2015/0037617 A1* | 2/2015 | Cabiri | H01M 2/0285 429/7 |
| 2015/0162590 A1* | 6/2015 | Takahashi | H01M 2/06 429/161 |

FOREIGN PATENT DOCUMENTS

| | | |
|---|---|---|
| CN | 101536222 A | 9/2009 |
| CN | 103325985 A | 9/2013 |
| CN | 104701573 A | 6/2015 |
| JP | H10189390 A | 7/1998 |
| JP | 2002050338 A | 2/2002 |
| JP | 2005174844 A | 6/2005 |
| JP | 2006155934 A | 6/2006 |
| JP | 2006324318 A | 11/2006 |
| JP | 2009187768 A | 8/2009 |
| JP | 2011023531 A | 2/2011 |
| JP | 2012142095 A | 7/2012 |
| JP | 2012523086 A | 9/2012 |
| JP | 2013149813 A | 8/2013 |
| JP | 2014524637 A | 9/2014 |
| KR | 20010008762 A | 2/2001 |
| KR | 20030022589 A | 3/2003 |
| KR | 20050121510 A | 12/2005 |
| KR | 20130085349 A | 7/2013 |
| KR | 101491721 B1 | 2/2015 |
| KR | 20150038964 A | 4/2015 |
| KR | 20150109018 A | 10/2015 |

OTHER PUBLICATIONS

Extended European Search Report including Written Opinion for Application No. EP16857711.2 dated May 28, 2018.
Chinese Search Report for Application No. 201680049313.3, dated Aug. 4, 2020, pp. 1-3.

* cited by examiner

POUCH TYPE OF BATTERY CELL HAVING UNIT ELECTRODE WHERE A PLURALITY OF ELECTRODE TABS ARE FORMED

CROSS-REFERENCE TO RELATED APPLICATIONS

This application is a national phase entry under 35 U.S.C. § 371 of International Application No. PCT/KR2016/011457 filed on Oct. 13, 2016, which claims priority to Korean Patent Application No. 10-2015-0147175 filed on Oct. 22, 2015 with the Korean Intellectual Property Office, the entire contents of which are incorporated herein by reference.

TECHNICAL FIELD

The present invention relates to a pouch-type of battery cell including a unit electrode where a plurality of electrode tabs are formed.

BACKGROUND ART

As information technology has remarkably developed, various kinds of portable information and communication devices have spread, and accordingly, the 21st century is being developed into a "ubiquitous society" that can provide high quality information services regardless of time and place.

Lithium rechargeable batteries occupy an important position in the development base for such a ubiquitous society. Specifically, a lithium rechargeable battery that can be charged and discharged is widely used not only as an energy source for a wireless mobile device, and but also as an energy source of an electric vehicle, a hybrid electric vehicle, and the like which are suggested to solve air pollution in conventional gasoline vehicles and diesel vehicles using fossil fuels.

As described above, as the devices to which the lithium rechargeable batteries are applied are diversified, the lithium rechargeable batteries have been diversified to provide output and capacity that are suitable for the applied devices.

The lithium rechargeable battery can be classified into a cylindrical type of battery cell, a prism type of battery cell, a pouch type of battery cell, and the like depending on its shape. Among these, the pouch type of battery cell has been attracting attention since it can be stacked with a high degree of integration, has high energy density per weight, and is inexpensive and easy to deform.

In particular, the pouch-type battery cell may be provided as a high-output/high-capacity battery cell in order to be installed in a device that requires a high-capacity battery, such as an electric vehicle, a hybrid electric vehicle, an energy storage system (ESS), and the like.

Figure 1:
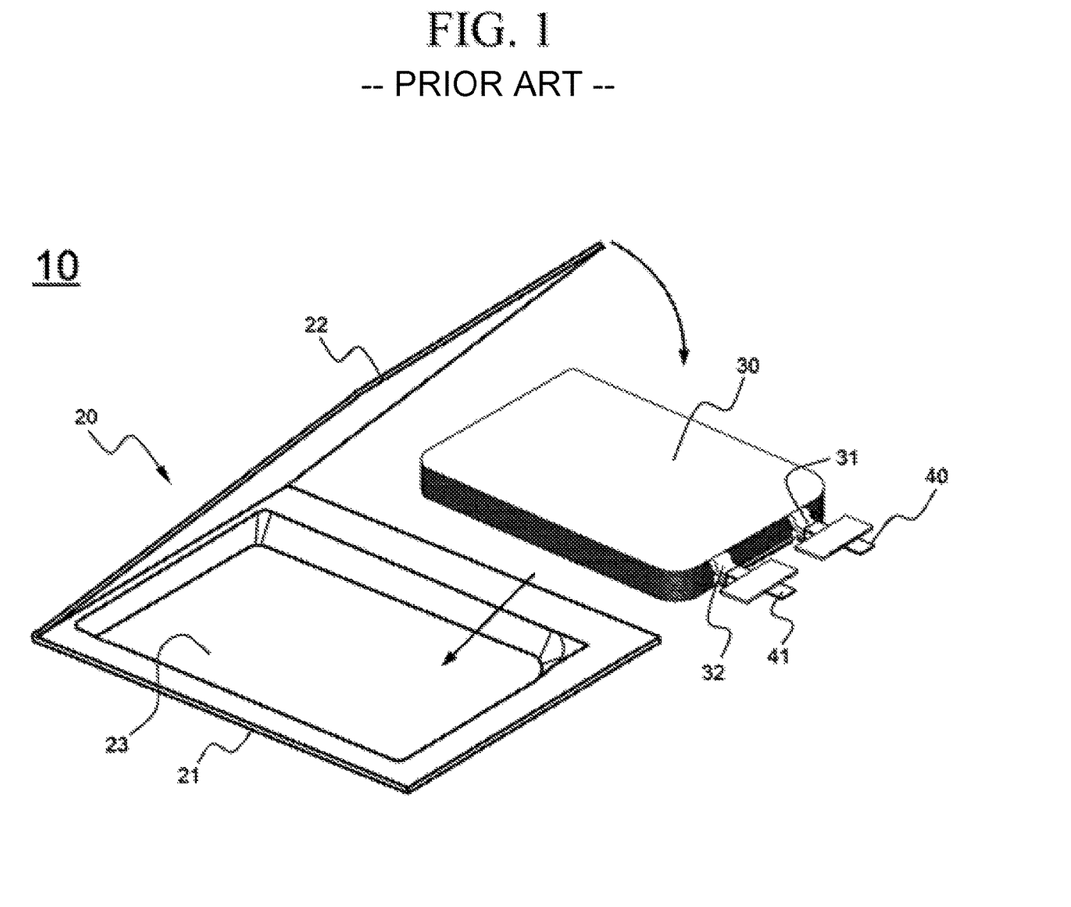
FIG. 1 is a decomposition diagram of a conventional lithium rechargeable battery.

FIG. 1 schematically illustrates a general structure of a representative pouch-type battery cell that includes a stacked type of electrode assembly.

Referring to FIG. 1, a battery cell 10 has a structure in which an electrode assembly 30 formed of a positive electrode, a negative electrode, and a separator disposed between the positive electrode and the negative electrode is embedded in a pouch type of battery case 20, and a positive electrode tab 31 and a negative electrode tab 32 of the electrode assembly 30 are respectively welded to two electrode leads 40 and 41 and then sealed to be exposed to the outside of the battery case 20.

The battery case 20 is provided as a soft packaging material such as an aluminum laminated sheet, and a case main body 21 that includes a concave-shaped receiving portion 23 where the electrode assembly 30 can be mounted and a cover 22 of which one side is connected to the case main body 21.

The electrode assembly 30 used in the battery cell 10 may have a jelly roll type of structure or a stacked/folding type structure other than the stacked type of structure as shown in FIG. 1. A plurality of positive electrode tabs 31 and a plurality of negative electrode tabs 32 of the stacked type of electrode assembly 30 are respectively welded to the electrode leads 40 and 41.

Such a battery cell 10 may be provided as a high-output/high-capacity battery by expanding a horizontal area of the electrode assembly 30 in order to be installed in a device that requires a high-capacity battery. However, as the horizontal area of the electrode assembly 30 is expanded, an electrochemical reaction of the electrode assembly 30 occurs only at the periphery of the electrode tabs 31 and 32, and therefore capacity of the battery cannot be effectively used.

Accordingly, a battery cell that can solve such a problem is required.

DISCLOSURE

Technical Problem

The present invention has been made to solve the above-mentioned problems of the prior art and conventional technical problems.

The present invention has been made to provide a battery cell that enables effective use of battery capacity by controlling an electrochemical reaction of an electrode assembly to be uniformly generated throughout the electrode assembly even through the size of the electrode assembly is increased to form a high-output/high-capacity battery cell.

Technical Solution

In order to solve such a purpose, a battery cell according to an exemplary embodiment of the present invention includes:

an electrode assembly having a structure in which a positive electrode, a negative electrode, and a separator are laminated, each of the positive electrode and the negative electrode having 2×n (n≥2) sides on a plane, the separator disposed between the positive electrode and the negative electrode, wherein a positive tab is provided in each of odd-numbered sides among a first side to a 2n-th side of the positive electrode, and a negative electrode tab is provided in each of even-numbered sides among the first side to the 2n-th side, and thus the positive electrodes and the negative electrode tabs are alternately formed along the sides on a plane;

electrode terminals that are respectively disposed on a first side and a second side of the electrode assembly, in which outermost electrodes are disposed, or third sides which are side surfaces of the electrode assembly, being perpendicular to the first side and the second side, and are electrically connected to the positive electrode tabs and the negative electrode tabs; and a battery case having a structure of surrounding an external surface of the electrode assembly while the electrode terminals are partially exposed to the outside.

Here, n may imply a natural number of greater than 2. Accordingly, the positive electrode and the negative electrode may have a shape of a polygon having four sides, six sides, eight sides, and the like on a plane, the positive electrode tab may be provided on odd-numbered sides such as a first side, a third side, a fifth side, and the like, and the negative electrode tab may be provided on even-numbered sides such as a second side, a fourth side, a sixth side, and the like.

According to such a structure, a plurality of positive electrode tabs and a plurality of negative electrode tabs are provided at a distance from each other in proportion to the number of sides formed on a plane of the positive electrode and the negative electrode, and therefore battery capacity can be effectively used by controlling an electrochemical reaction of an electrode assembly to be uniformly generated throughout the electrode assembly even through the size of the electrode assembly is increased to form a high-output/high-capacity battery cell.

The electrode assembly may have a stacked type of structure or a laminated/stacked type of structure.

The stacked type of structure and the laminated/stacked type of structure are as follows.

A unit cell of the stacked type of structure can be manufactured by disposing a separator cut to a predetermined size between a positive electrode plate and a negative electrode plate, each made by coating an electrode mixture to a metal current collector, drying the coated current collector, pressing the dried current collector, cutting the pressed current collector to a predetermined size, and then laminating the positive electrode plate, the separator, and the negative electrode plate.

A unit cell of the laminated/stacked type of structure can be manufactured by coating an electrode mixture to a metal current collector, drying the coated current collector, pressing the dried current collector, cutting the same to a predetermined size, and then sequentially laminating the negative electrode, the separator, the positive electrode, and the separator from the bottom.

The electrode assembly may be formed in the shape of a quadrangle on a plane, but depending on a shape of a device where the battery cell is installed, the electrode assembly may be formed in the shape of a circle, an oval, a triangle, or a polygon.

The battery case may be formed of a laminated sheet including a resin outer layer, a barrier metal layer, and a resin sealant layer having a thermal melting property.

Since the resin outer layer requires excellent tolerance to an external environment, it is necessary for the resin outer layer to have tensile strength and weather resistance of higher than a predetermined level. Thus, as a polymer resin of the outer resin layer, polyethylene terephthalate (PET) and a stretchable nylon film may be preferably used.

It may be preferable to use aluminum as the barrier metal layer to serve a function of preventing inflow or leakage of a foreign substance such as a gas, moisture, and the like and a function of improving strength of the battery case.

The resin sealant layer has a thermal bonding property (thermal adherence) and has a low hygroscopic property for preventing permeation of an electrolyte solution, and a polyolefin resin that does not expand or is not eroded by the electrolyte solution may be preferably used. More preferably, casted polypropylene (CPP) may be used.

Depending on a device where the battery cell is installed, the size of the battery cell can be determined without a limit (i.e., n can be determined without a limit), but n may be preferably determined within a range of $2 \leq n \leq 10$ considering a manufacturing condition of the battery cell.

That is, the electrodes and the separators of the battery cell according to the exemplary embodiment of the present invention may have a shape having 4 sides, 6 sides, . . . , or 20 sides on a plane.

In one exemplary embodiment of the present invention, the positive electrode, the negative electrode, and the separator may be formed in the shape of a hexagon (i.e., n is 3) on a plane.

Specifically, the electrode assembly may have a shape of a hexagonal pole formed by laminating a plurality of electrodes and a separator.

The positive electrode terminal may be disposed on a first side of the electrode assembly, and the negative electrode terminal may be disposed on a second side, which is the opposite side of the first side.

For example, the first side may be one side on a horizontal plane of the topmost electrode of the electrode assembly, and the second side may be one side on a horizontal plane of the bottommost electrode of the electrode assembly.

The electrode terminals may be formed of a metal plate having a shape that corresponds to the first side and the second side. That is, the electrode terminals may be respectively formed in shapes respectively corresponding to an external circumferential shape of the first side and an external circumferential shape of the second side of the electrode assembly.

The electrode terminals may have a size of 50% to 120% with reference to a surface area of the corresponding first and second sides.

In one detailed exemplary embodiment of the electrode terminals, the electrode terminals may have a size of 50% or more to 100% or less with reference to a surface area of the corresponding first and second sides, and the positive electrode tabs and the negative electrode tabs may be bent inward in the first side and the second side and thus connected to external surfaces of the electrode terminals. When the electrode terminals have a size of under 50% of the surface area of the first side and the second size, output of the battery may be deteriorated. On the other hand, when the size of the electrode terminals exceeds 100% of the surface area of the first side and the second side, the electrode terminals are partially exposed on the first side or the second side such that it may be difficult to form a compact battery cell.

In another detailed exemplary embodiment of the electrode terminals, the electrode terminals may have a size of over 100% to 120% or less with reference to a surface area of the corresponding first and second sides, and the positive electrode tabs and the negative electrode tabs may be bent outside from the first side and the second side and thus connected to external surfaces of the electrode terminals. In such a structure, external circumference portions that exceed 100% of the size of the surface area of the first side and the second side are bent toward a central portion of the electrode assembly and then attached to a third side of the electrode assembly such that a compact battery cell can be formed.

In one exemplary embodiment of the present invention, a first opening through which the positive electrode terminal is partially exposed and a second opening through which the negative electrode terminal is exposed may be formed in the battery case.

Specifically, the first opening and the second opening may have a size of 30% to 90% with reference to the size of the electrode terminals. When the size of the first opening and the second opening is under 30% of the size of the electrode terminals, a contact area where the electrode assembly, the electrode terminals, and the device area connected is reduced, thereby causing deterioration of output of the battery. On the other hand, when the size of the first opening and the second opening exceeds 90% of the size of the electrode terminals, a sealing property of the battery may be deteriorated due to excessive-sized openings.

Insulation films may be respectively disposed between internal circumferences of the first and second openings and external circumferences of the electrode terminals. The insulation film is disposed between the battery case and the electrode terminal to assist improvement of the sealing property of the battery cell, and when the battery case is provided as a laminated sheet, a short-circuit due to contact between a metal layer exposed at an end of the laminated sheet and the electrode terminal can be prevented by the insulation film.

In one exemplary embodiment of the electrode tab, the electrode tab may have a structure in which a first bent portion is formed by being protruded from an electrode and bent in a direction of the first side or the second side and a second bent portion is formed by being extended from the first bent portion and bent toward a direction of the electrode terminal at a location corresponding to the first side or the second side. Accordingly, a plurality of electrode tabs may contact electrode terminals that are disposed on the first side or the second side while being in contact with each other.

Specifically, ends of the electrode tabs may be connected to the electrode terminals by welding while being overlapped with each other.

In another exemplary embodiment of the battery cell according to the present invention, the electrode terminals may be disposed on third sides, and in this case, the size of the electrode terminal may correspond to a size of the third side.

The electrode terminals may include a first electrode terminal provided in a direction of the first side and a second electrode terminal provided in a direction of the second side, and an insulation member may be provided between the first electrode terminal and the second electrode terminal.

The insulation member is made of an electrical insulation material, and for example, may be made of a polyolefin resin, but this is not restrictive.

Specifically, the first electrode terminal may be a positive electrode terminal and the second electrode terminal may be a negative electrode terminal.

In such a structure, the electrode terminal may have a shape of a quadrangular plate corresponding to a shape of the third side.

Specifically, the electrode terminal may have a 2×n prismatic hollow structure in which sides of a plurality of quadrangular plates are connected for receiving the electrode assembly.

In such a structure, the battery case may include a first case that is disposed on the first side and a second case that is disposed on the second side.

Specifically, cover portions that are bent in a direction of the electrode terminal and protrude therefrom may be formed in external circumferential surfaces of the first case and the second case to partially cover each of opposite ends of the electrode terminal.

In addition, an insulation film may be provided between the electrode terminal and the cover portion. The insulation film may be disposed between the battery case and the electrode terminal to assist improvement of the sealing property of the battery cell, and when the battery case is provided as a laminated sheet, a short-circuit due to contact between a metal layer exposed at an end of the laminated sheet and the electrode terminal can be prevented by the insulation film.

In another exemplary embodiment of the electrode tab, the electrode tabs may have a structure in which a third bent portion is formed by being protruded from the electrode and bent in a direction of the first side or the second side and a first contact portion that extends in a direction of the first side or the second side from the third bent portion.

An adhesive member may be disposed between the electrode terminals and the battery case to improve the sealing property of the battery cell. The adhesive member improves adherence between the electrode terminals and the battery case to improve the sealing property of the battery cell.

The battery cell may be a lithium rechargeable battery, or specifically, may be a lithium ion battery or a lithium ion polymer battery.

Generally, the lithium rechargeable battery includes a positive electrode, a negative electrode, a separator, and a non-aqueous electrolyte solution containing a lithium salt.

The positive electrode is prepared, for example, by coating a mixture of a positive electrode active material, a conductive material, and a binder on a positive electrode current collector, and then drying the resultant. Alternatively, a filler may be further added to the mixture.

The positive active material may be a layered compound such as a lithium cobalt oxide ($LiCoO_2$), a lithium nickel oxide ($LiNiO_2$), and the like, or a compound substituted with one or more transition metals; a lithium manganese oxide such as $LiMnO_3$, $LiMn_2O_3$, and $LiMnO_2$ represented by a chemical formula $Li_{1+x}Mn_{2-x}O_4$ (where x is 0 to 0.33); a copper oxide such as lithium copper oxide ($Li_2CuO_2$); a vanadium oxide such as $LiV_3O_8$, $LiFe_3O_4$, $V_2O_5$, $Cu_2V_2O_7$, and the like; a Ni-site lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; a disulfide compound; $Fe_2(MoO_4)_3$; and the like, but this is not restrictive.

The conductive material is usually added in an amount of 1% to 30% by weight based on the total weight of the mixture including the cathode active material. Such a conductive material is not particularly limited as long as it has electrical conductivity and does not cause a chemical change in the battery, and examples thereof include graphite such as natural graphite and artificial graphite; carbon compounds such as carbon black, acetylene black, Ketjen black, channel black, furnace black, lamp black, and summer black; conductive fibers such as carbon fiber and metal fiber; metal powders such as carbon fluoride, aluminum, and nickel powders; conductive whiskers such as zinc oxide and potassium titanate; conductive metal oxides such as titanium oxide; conductive materials such as polyphenylene derivatives; and the like can be used.

The binder is a component that assists in bonding between the active material and the conductive material and bonding to the current collector, and is typically added in an amount of 1 wt % to 30 wt % based on the total weight of the mixture containing the cathode active material. Examples of such binders include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylenepropylene-diene terpolymer (EPDM), sulfonated EPDM, styrene butylene rubber, fluorine rubber, various copolymers, and the like.

The filler is selectively used as a component for suppressing expansion of the positive electrode, and is not particularly limited as long as it is a fibrous material that does not cause a chemical change in the battery. Examples of the filler include olefin polymers such as polyethylene and polypropylene, fibrous materials such as glass fiber and carbon fiber, and the like.

The negative electrode is manufactured by applying and drying a negative active material on a negative current collector, and as necessary, the above-described components may be selectively further included.

Examples of the negative electrode active material include carbon such as non-graphitized carbon and graphite carbon; Al, B, P, Si, elements of Group 1 of the periodic table, $Li_xFe_2O_3$ ($0 \leq X \leq 1$), $Li_xWO_2$ ($0 \leq X \leq 1$), $Sn_xMe_{1-x}Me'_yO_z$ (Me:Mn, Fe, Pb, Ge, Me', Al, B, P, Si, elements of Groups 1, 2, and 3 of the periodic table, or a halogen; $0<x \leq 1$; $1 \leq y \leq 3$; $1 \leq z \leq 8$); a metal complex oxide; lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and the like.

The separator and the separation film are interposed between the positive electrode and the negative electrode, and an insulating thin film having high ion permeability and mechanical strength is used. A pore diameter of the separator is about 0.01 μm to 10 μm, and the thickness is about 5 μm to 300 μm. As the separator, for example, olefinic polymers such as polypropylene, which is chemically resistant and hydrophobic, or a sheet or a nonwoven fabric made of glass fiber, polyethylene, or the like, is used. When a solid electrolyte such as a polymer is used as an electrolyte, the solid electrolyte may also serve as a separator.

The nonaqueous electrolytic solution containing a lithium salt is formed of a polar organic electrolytic solution and a lithium salt. As the electrolytic solution, a non-aqueous liquid electrolyte, an organic solid electrolyte, an inorganic solid electrolyte, and the like are used.

As the nonaqueous liquid electrolytic solution, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyltetrahydrofuran, dimethyl sulfoxide, 1,3-dioxolane, formamide, dimethylformamide, dioxolane, acetonitrile, nitromethane, methyl formate, methyl acetate, a phosphoric acid triester, trimethoxymethane, a dioxolane derivative, sulfolane, methyl sulfolane, 1,3-dimethyl-2-imidazolidinone, a propylene carbonate derivative, a tetrahydrofuran derivative, ether, methyl pyrophosphate, ethyl propionate, and the like can be used.

As the organic solid electrolyte, for example, a polymer including a polyethylene derivative, a polyethylene oxide derivative, a polypropylene oxide derivative, a phosphate ester polymer, a polyagitation lysine, a polyester sulfide, a polyvinyl alcohol, a polyvinylidene fluoride, polymers containing ionic dissociation groups, and the like may be used.

As the inorganic solid electrolyte, for example, nitrides of Li, halides of Li, or sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like, may be used.

The lithium salt is a substance which is soluble in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lower aliphatic carbonic acid lithium, 4-phenyl boric acid lithium, imide, and the like may be used.

In addition, for the purpose of improving the charge-discharge characteristics and the flame retardancy, non-aqueous liquid electrolytes include, for example, pyridine, triethylphosphite, triethanolamine, cyclic ether, ethylenediamine, n-glyme, hexaphosphoric triamide, benzene derivatives, sulfur, quinone imine dyes, N-substituted oxazolidinones, N,N-substituted imidazolidines, ethylene glycol dialkyl ethers, ammonium salts, pyrrole, 2-methoxyethanol, aluminum trichloride, and the like may be added. In some cases, a halogen-containing solvent such as carbon tetrachloride or ethylene trifluoride may be further added to impart inflammability, or carbon dioxide gas may be further added to improve high-temperature storage characteristics.

The present invention provides a battery pack that includes at least one battery cell.

The present invention also provides a device that includes the battery pack as a power source.

The device may be selected from a mobile phone, a wearable electronic device, a portable computer, a Smartpad, a net book, a light electronic vehicle (LEV), an electric vehicle, a hybrid electric vehicle, a plug-in electric vehicle, and an electric power storage device.

The above-described devices or apparatuses are well known in the art, and therefore a detailed description thereof will be omitted herein.

MODE FOR INVENTION

Hereinafter, an exemplary embodiment of the present invention is described in detail with reference to the drawings, but the scope of the present invention is not limited thereto.

Figure 2:
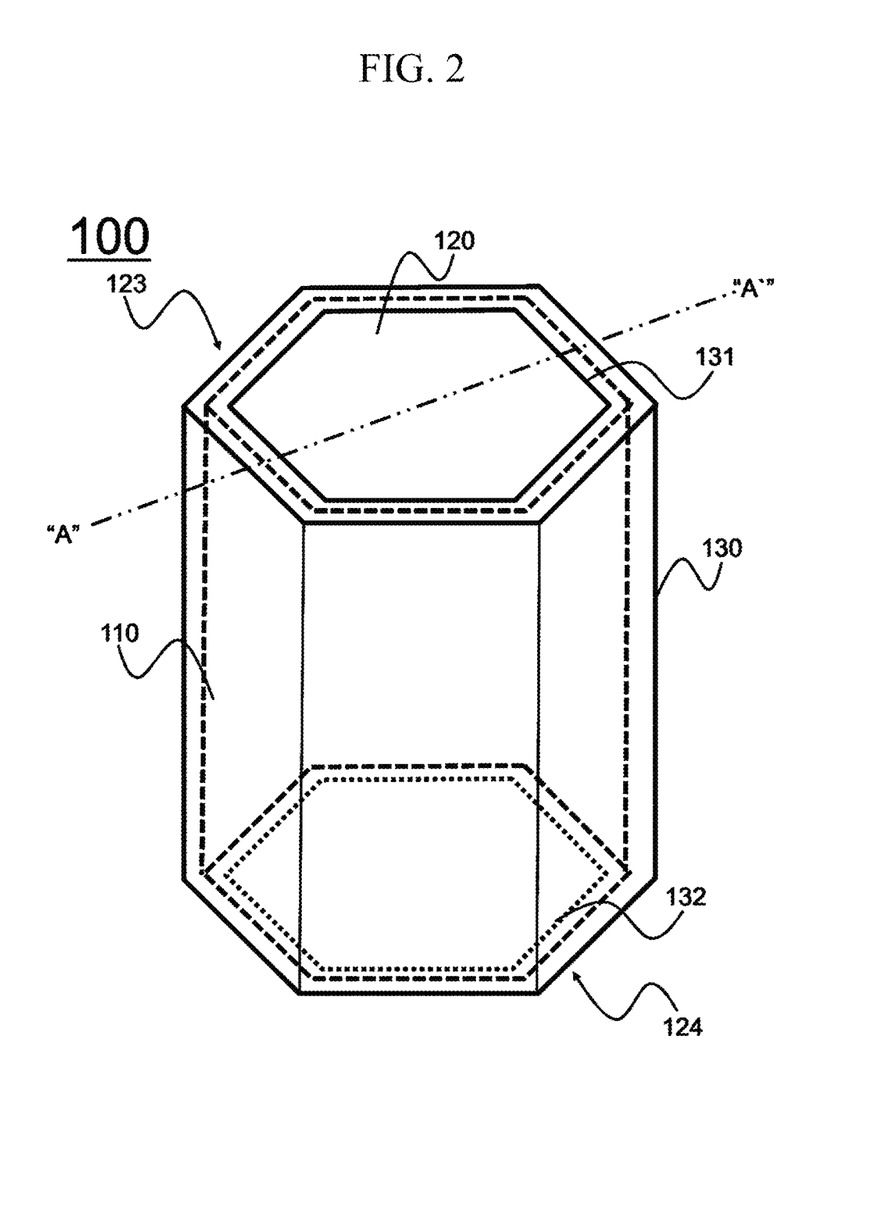
FIG. 2 is a perspective view of a battery cell according to an exemplary embodiment of the present invention.
Figure 3:
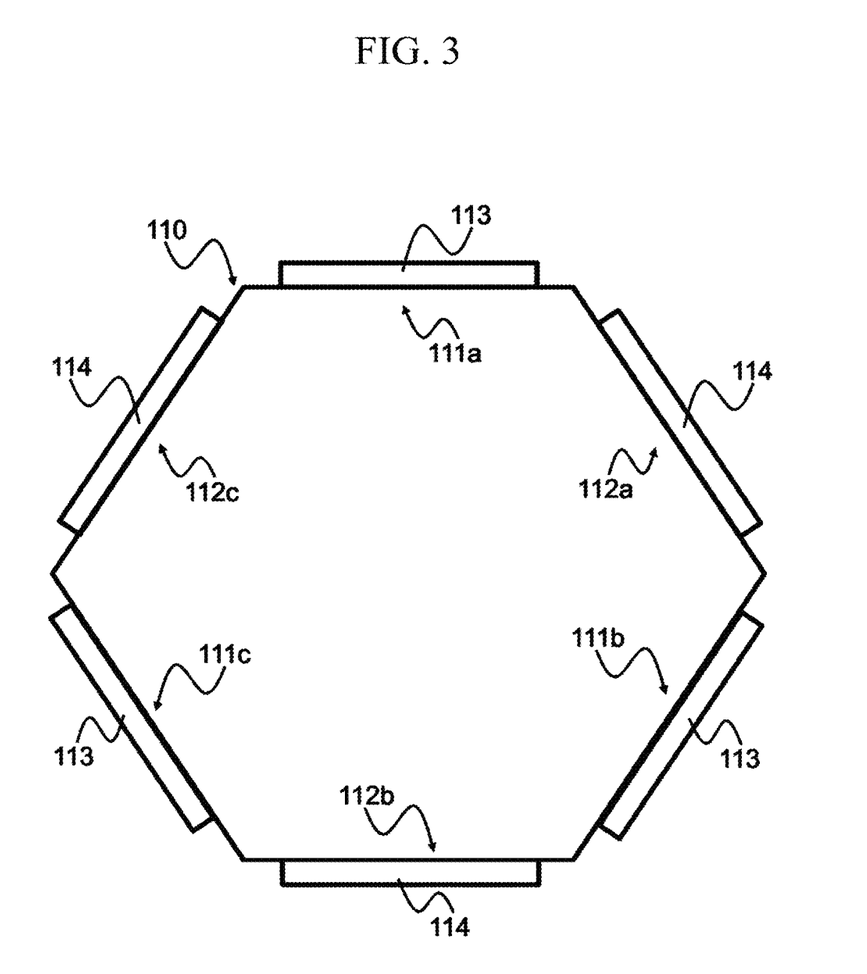
FIG. 3 is a top plan view of the battery cell from which a battery case of FIG. 2 is removed.
Figure 4:
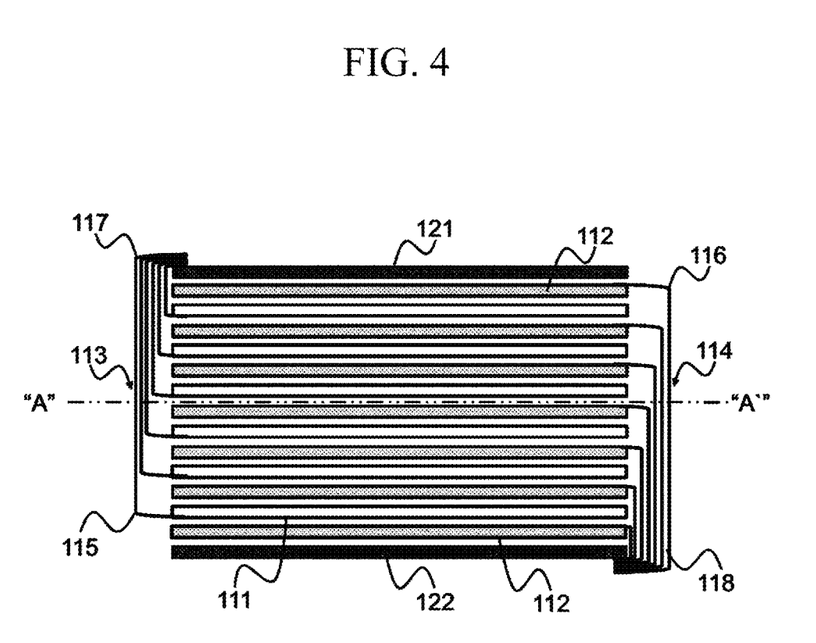
FIG. 4 is a vertical cross-sectional view of the battery cell of FIG. 3.

FIG. 2 is a schematic perspective view of a battery cell according to an exemplary embodiment of the present invention, FIG. 3 is a schematic top plan view of the battery cell from which a battery case of FIG. 2 is removed, and FIG. 4 is a schematic vertical cross-sectional view of the battery cell of FIG. 3.

Referring to FIG. 2 to FIG. 4, a battery cell 100 is formed of an electrode assembly 110, electrode terminals 120, and a battery case 130.

The electrode assembly 110 has a structure in which a positive electrode 111, a negative electrode 112, and a separator (not shown) are stacked. Here, the separator is disposed between the positive electrode 111 and the negative electrode 112 and has a shape corresponding to the positive electrode 111 and the negative electrode 112.

The electrode assembly 110 is formed in the shape of a hexagonal pole, and the positive electrode 111 and the negative electrode 112 are each formed in the shape of a hexagon having six planar sides. Positive electrode tabs 113 are formed in a first side 111a, a third side 111b, and a fifth side 111c of the positive electrode 111, and negative electrode tabs 114 are formed in a second side 112a, a fourth side 112b, and a sixth side 112c of the negative electrode 112.

On a plane, the positive electrode tabs 113 and the negative electrode tabs 114 are alternately arranged along the sides.

A positive electrode terminal 121 is disposed on a first side 123, which is the topmost side where a topmost negative electrode 112 of the electrode assembly 110 is disposed, a negative electrode terminal 122 is disposed on a second side 124, which is the bottommost side where the bottommost negative electrode 112 of the electrode assembly 110 is disposed, and the positive electrode tabs 113 and the negative electrode tabs 114 are respectively connected to the positive electrode terminal 121 and the negative electrode terminal 122.

The electrode terminals 120 have a size of 100% of the area of the first side 123 and the area of the second side 124.

The battery case 130 surrounds an exterior surface of the electrode assembly 110 while center portions of the electrode terminals 120 are exposed to the outside. Specifically, a first opening 131 through which the positive electrode 121 is partially exposed is formed in an upper end side of the battery case 130, and a second opening 132 through which the negative electrode terminal 122 is partially exposed is formed in a bottom end side of the battery case 130.

The first opening 131 and the second opening 132 have a size of 90% of the size of the electrode terminals 120.

First bent portions 115 and 116 and second bent portions 117 and 118 are formed in the electrode tabs 113 and 114. The first bent portions 115 and 116 protrude from the electrodes 111 and 112 and are bent toward the first side 123 or the second side 124, and the second bent portions 117 and 118 extend from the first bent portions 115 and 116 and are bent toward the electrode terminals 121 and 122 at locations corresponding to the first side 123 or the second side 124.

The electrode tabs 113 and 114 are combined to the electrode terminals 120 by welding.

Figure 5:
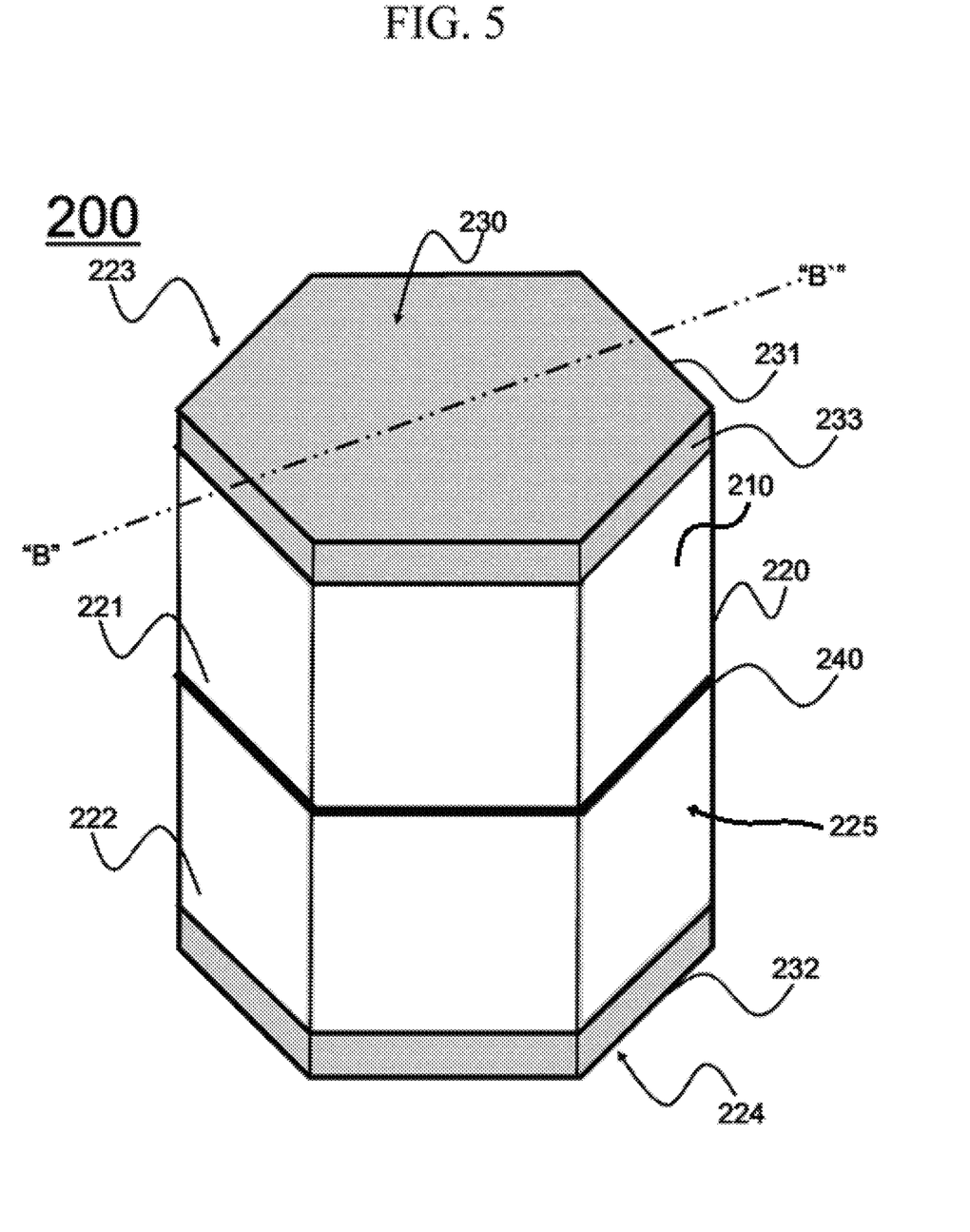
FIG. 5 is a perspective view of a battery cell according to another exemplary embodiment of the present invention.
Figure 6:
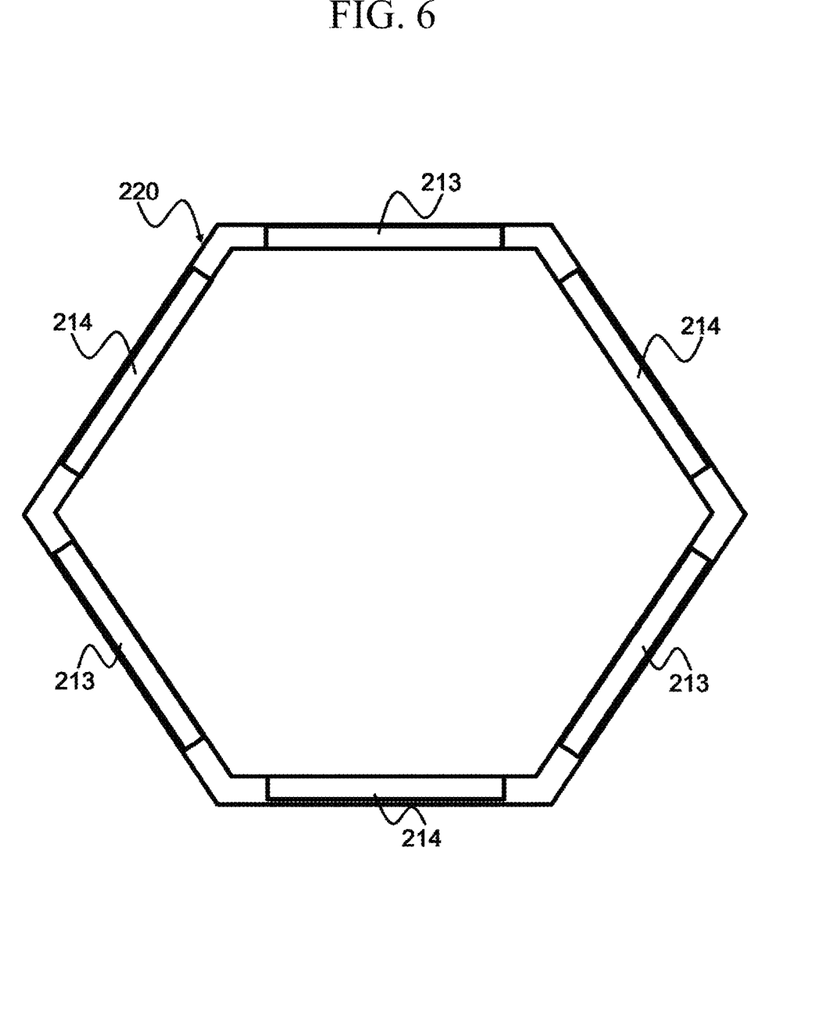
FIG. 6 is a top plan view of the battery cell from which a battery case of FIG. 5 is removed.
Figure 7:
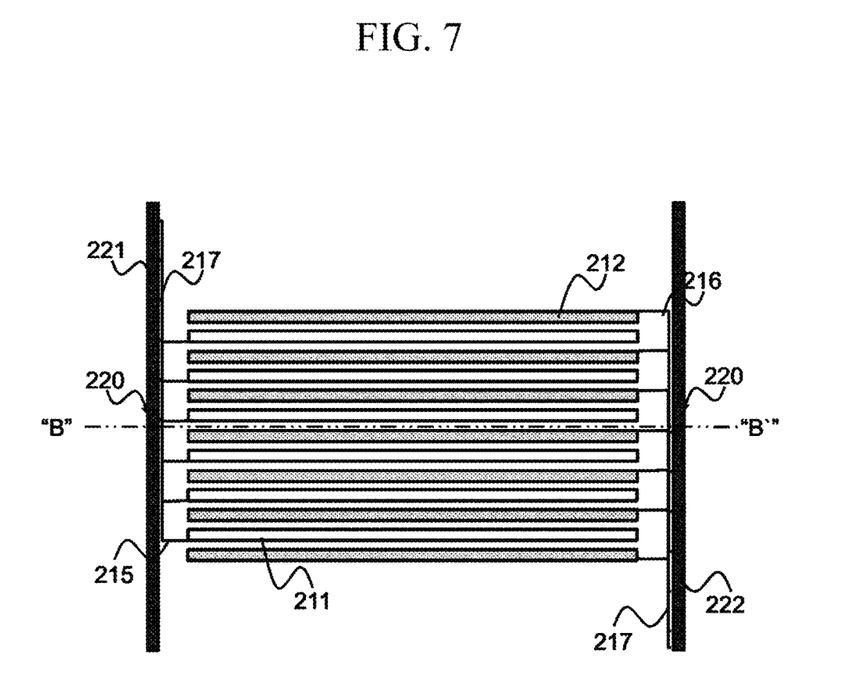
FIG. 7 is a vertical cross-sectional view of the battery cell of FIG. 5.

FIG. 5 is a schematic perspective view of a battery cell according to another exemplary embodiment of the present invention, FIG. 6 is a schematic top plan view of the battery cell from which a battery case of FIG. 5 is removed, and FIG. 7 is a schematic vertical cross-sectional view of the battery cell of FIG. 6.

Referring to FIG. 5 to FIG. 7, in a battery cell 200, electrode terminals 220 are disposed on third sides 225, which are side surfaces of an electrode assembly 210, and positive electrode tabs 213 and negative electrode tabs 214 are respectively electrically connected to a positive electrode terminal 221 and a negative electrode terminal 222.

The electrode terminal 220 is formed of quadrangular plates, and the electrode terminal 220 is formed in the shape of a hexagonal pole that receives the electrode assembly 210.

Specifically, the electrode terminal 220 is formed of the positive electrode terminal 221 formed in a direction of a first side 223 and the negative electrode terminal 222 formed in a direction of a second side 224, and an electrical insulation member 240 is disposed between the positive electrode terminal 221 and the negative electrode terminal 222.

A battery case 230 is formed of a first case 231 that is disposed on the first side 223 and a second case 232 that is disposed on the second side 224.

A cover portion 233 is provided in an external circumferential surface of each of the first case 231 and the second case 232 to partially cover opposite ends of the electrode terminal 220. The cover portion 233 is bent toward a direction of the electrode terminal 220 and protruded therefrom.

Each of the electrode tabs 213 and 214 has a structure in which third bent portions 215 and 216 are formed by being protruded from the electrodes 211 and 212 and bent toward a direction of the first side 223 or the second side 224, and first contact portions 217 are formed by extending in the direction of the first side 223 or the second side 224.

Structures other than the electrode terminal and the battery case are the same as those of the exemplary embodiment described with reference to FIG. 2 to FIG. 4, and therefore no further detailed description will be provided.

While the present invention has been particularly shown and described with reference to exemplary embodiments thereof, it will be understood by those skilled in the art that various changes in form and details may be made therein without departing from the spirit and scope of the invention as defined by the appended claims.

INDUSTRIAL APPLICABILITY

As described above, in the battery cell according to the present invention, a plurality of positive electrode tabs and a plurality of negative electrode tabs are formed at a distance from each other in proportion to the number of sides formed on a plane of the positive electrode and the negative electrode, respectively, and therefore battery capacity can be effectively used by controlling an electrochemical reaction of the electrode assembly to be uniformly generated throughout the electrode assembly even through the size of the electrode assembly is increased to form a high-output/high-capacity battery cell.

The invention claimed is:

1. A lithium rechargeable battery, comprising:
an electrode assembly having a structure in which a positive electrode, a negative electrode, and a separator are laminated, each of the positive electrode and the negative electrode having 2×n sides on a plane, n being greater than or equal to 2, the separator disposed between the positive electrode and the negative electrode, wherein a positive tab is provided in each of odd-numbered sides among a first side to a 2n-th side of the positive electrode, and a negative electrode tab is provided in each of even-numbered sides among the first side to the 2n-th side, and thus the positive electrodes and the negative electrode tabs are alternately formed along the sides on a plane;
a battery case having a structure surrounding an external surface of the electrode assembly, the battery case having 2×n sides each extending perpendicular to the planes of the electrodes and partially covering top and bottom surfaces of the electrode assembly that each extend parallel to the planes of the electrodes; and
positive and negative electrode terminals that are respectively exposed at a first side and a second side of the electrode assembly, the positive and negative electrode terminals being respectively electrically connected to the positive electrode tabs and the negative electrode tabs, the positive and negative electrode terminals each defining a respective 2n-sided plate structure, the positive and negative electrode terminals together forming entire first and second sides of the lithium rechargeable battery that extend parallel to the planes of the electrodes except for top and bottom peripheries of the battery case that are bent over peripheral edges of the electrode terminals, the sides of the battery case forming entire third sides of the lithium rechargeable battery that each extend perpendicular to the planes of the electrodes, wherein the positive and negative electrode terminals are partially exposed to an outside of the battery case through respective first and second openings formed in the battery case at the respective first and second sides of the electrode assembly, and the battery case is electrically insulated from the positive and negative electrode terminals.

2. The lithium rechargeable battery of claim 1, wherein the electrode assembly has a stacked type of structure or a laminated/stacked type of structure.

3. The lithium rechargeable battery of claim 1, wherein the battery case is formed of a laminated sheet including a resin outer layer, a barrier metal layer, and a resin sealant layer having a thermal melting property.

4. The lithium rechargeable battery of claim 1, wherein the positive electrode, the negative electrode, and the separator each have a shape of a hexagon on a plane.

5. The lithium rechargeable battery of claim 4, wherein the electrode assembly is formed in the shape of a hexagonal pole.

6. The lithium rechargeable battery of claim 1, wherein the electrode terminals are each formed of a metal plate having a shape that corresponds to the first side and the second side, respectively.

7. The lithium rechargeable battery of claim 6, wherein the electrode terminals each have a size of 50% to 120% with reference to a surface area of the corresponding first and second sides.

8. The lithium rechargeable battery of claim 7, wherein the electrode terminals each have a size of 50% or more to 100% or less with reference to a surface area of the corresponding first and second sides, and the positive electrode tabs and the negative electrode tabs are each bent inward towards the first side or the second side and are thus connected to external surfaces of the electrode terminals, respectively.

9. The lithium rechargeable battery of claim 7, wherein the electrode terminals each have a size of over 100% to 120% or less with reference to a surface area of the corresponding first and second sides, and the positive electrode tabs and the negative electrode tabs are each bent outward towards the first side and the second side and are thus connected to external surfaces of the electrode terminals, respectively.

10. The lithium rechargeable battery of claim 1, wherein the first opening and the second opening have a size of 30% to 90% with reference to the size of the electrode terminals.

11. The lithium rechargeable battery of claim 1, wherein the electrode tabs each have a structure in which a first bent portion is formed by being protruded from one of the electrodes and bent in a direction of the first side or the second side and a second bent portion is formed by being extended from the first bent portion and bent toward a direction of the electrode terminal at a location corresponding to the first side or the second side.

12. The lithium rechargeable battery of claim 1, wherein the electrode tabs each have a structure in which a bent portion is formed by being protruded from one of the electrodes and bent in a direction of the first side or the second side and a first contact portion that extends in a direction of the first side or the second side from the bent portion.

13. A lithium rechargeable battery, comprising:
an electrode assembly having a structure in which a positive electrode, a negative electrode, and a separator are laminated, each of the positive electrode and the negative electrode having 2×n sides on a plane, n being greater than or equal to 2, the separator disposed between the positive electrode and the negative electrode, wherein a positive tab is provided in each of odd-numbered sides among a first side to a 2n-th side of the positive electrode, and a negative electrode tab is provided in each of even-numbered sides among the first side to the 2n-th side, and thus the positive electrodes and the negative electrode tabs are alternately formed along the sides on a plane;
a battery case having a structure surrounding an external surface of the electrode assembly, the battery case having top and bottom cover portions extending parallel to the planes of the electrodes and partially covering side surfaces of the electrode assembly that each extend perpendicular to the planes of the electrodes, the top and bottom cover portions forming entire respective first and second sides of the lithium rechargeable battery that extend parallel to the planes of the electrodes; and
positive and negative electrode terminals each defining a respective 2n-sided prismatic hollow structure in which the electrode assembly is partially received, a first portion of the electrode assembly adjacent a first one of the cover portions being partially received within a first central volume defined within the 2n-sided prismatic hollow structure of the positive electrode terminal, a second portion of the electrode assembly adjacent a second one of the cover portions being partially received within a second central volume defined within the 2n-sided prismatic hollow structure of the negative electrode terminal, the positive and negative electrode terminals being respectively electrically connected to the positive electrode tabs and the negative electrode tabs; and
an insulation member extending circumferentially about the electrode assembly between the positive electrode terminal and the negative electrode terminal,
wherein the positive and negative electrode terminals are partially exposed to an outside of the battery case between the top and bottom cover portions, the positive and negative electrode terminals together forming entire third sides of the lithium rechargeable battery except for peripheries of the top and bottom cover portions of the battery case that are bent over peripheral edges of the electrode terminals, and the battery case is electrically insulated from the positive and negative electrode terminals.

14. The lithium rechargeable battery of claim 13, wherein each electrode terminal comprises quadrangular plates that each corresponds to a shape of a respective one of the third sides.

15. The lithium rechargeable battery of claim 13, wherein the electrode assembly has a stacked type of structure or a laminated/stacked type of structure.

16. The lithium rechargeable battery of claim 13, wherein the battery case is formed of a laminated sheet including a resin outer layer, a barrier metal layer, and a resin sealant layer having a thermal melting property.

17. The lithium rechargeable battery of claim 13, wherein the positive electrode, the negative electrode, and the separator each have a shape of a hexagon on a plane.

18. The lithium rechargeable battery of claim 17, wherein the electrode assembly is formed in the shape of a hexagonal pole.

19. The lithium rechargeable battery of claim 13, wherein the electrode tabs each have a structure in which a first bent portion is formed by being protruded from one of the electrodes and bent in a direction of the first side or the second side and a second bent portion is formed by being extended from the first bent portion and bent toward a direction of the electrode terminal at a location corresponding to the first side or the second side.

20. The lithium rechargeable battery of claim 13, wherein the electrode tabs each have a structure in which a bent portion is formed by being protruded from one of the electrodes and bent in a direction of the first side or the second side and a first contact portion that extends in a direction of the first side or the second side from the bent portion.

* * * * *